(12) United States Patent
Maier et al.

(10) Patent No.: US 7,492,165 B2
(45) Date of Patent: Feb. 17, 2009

(54) POSITION DETECTING DEVICE WITH A MICROWAVE ANTENNA ARRANGEMENT

(75) Inventors: Marcus Maier, Stuttgart (DE); Thomas Reininger, Wernau (DE)

(73) Assignee: Festo AG & Co., Esslingen (DE)

( * ) Notice: Subject to any disclaimer, the term of this patent is extended or adjusted under 35 U.S.C. 154(b) by 180 days.

(21) Appl. No.: 11/494,111

(22) Filed: Jul. 27, 2006

(65) Prior Publication Data
US 2008/0106272 A1    May 8, 2008

(30) Foreign Application Priority Data
Aug. 11, 2005   (EP) .................................. 05017444

(51) Int. Cl.
*G01R 27/04* (2006.01)
(52) U.S. Cl. ...................................... 324/644; 607/156
(58) Field of Classification Search ................ 324/644; 607/156
See application file for complete search history.

(56) References Cited

U.S. PATENT DOCUMENTS

| | | | | |
|---|---|---|---|---|
| 4,901,628 A | * | 2/1990 | Krage | 92/5 R |
| 5,392,049 A | * | 2/1995 | Gunnarsson | 342/42 |
| 5,457,394 A | | 10/1995 | McEwan | 324/642 |
| 6,005,395 A | * | 12/1999 | Chan et al. | 324/635 |
| 7,095,944 B2 | * | 8/2006 | Trummer | 385/147 |
| 2005/0191027 A1 | | 9/2005 | Trummer | |
| 2007/0035310 A1 | * | 2/2007 | Muller et al. | 324/635 |

FOREIGN PATENT DOCUMENTS

| | | |
|---|---|---|
| DE | 19903183 A1 | 8/2000 |
| DE | 10205904 A1 | 8/2003 |
| FR | 820721 | 11/1937 |
| JP | 10-300604 | 11/1998 |
| JP | 11-030553 | 2/1999 |

OTHER PUBLICATIONS

Wang et al., "Accurate Global Solutions of EM Boundary-Value Problems for Coaxial Radiators", IEEE Transactions on Antennas and Propagation, pp. 767-770, No. 5 (May 1994).

* cited by examiner

*Primary Examiner*—Vincent Q. Nguyen
(74) *Attorney, Agent, or Firm*—Hoffman & Baron, LLP

(57) ABSTRACT

A position detecting device finds the position of a specimen arranged in a conductive structure on the basis of microwaves and includes an electrical circuit for the production and/or reception of the microwaves and a microwave antenna arrangement for emitting and/or receiving the microwaves. Said position detecting device includes a dielectric antenna body with a first pole face and a second pole face for the transmission of microwaves. The antenna body forms a component of the microwave antenna arrangement. The electrical circuit is at least in part arranged on the antenna body.

27 Claims, 7 Drawing Sheets

POSITION DETECTING DEVICE WITH A MICROWAVE ANTENNA ARRANGEMENT

CROSS-REFERENCE TO RELATED APPLICATION

This application claims priority based on European Patent Application No. 05 017 444.0 filed on Aug. 11, 2005, which is incorporated herein by reference.

BACKGROUND OF THE INVENTION

1. Field of the Invention

The invention relates to a position detecting device for finding the position of a specimen arranged in a conductive structure on the basis of microwaves, comprising an electrical circuit for producing and/or receiving the microwaves and a microwave antenna arrangement for emitting and/or receiving the microwaves.

2. Description of the Related Art

Such a position detecting device is for example described in the German patent publication DE 102 05 904 A1. The conductive structure is constituted by a housing of a pneumatic cylinder or of a hydraulic cylinder, in which a piston is arranged for longitudinal motion. The position detecting device serves for finding the distance of the piston with respect to a longitudinal terminal position, in the vicinity of which the microwave antenna arrangement is arranged. The microwave antenna arrangement comprises a coupling probe, which is held by a dielectric holding system. The housing or, respectively, the conductive structure cooperates with the coupling probe as regards the propagation of the microwaves. It is hence essential for the distance of the coupling probe from the housing be constant, that is to say that the dielectric holding system ensures having this constant distance.

The accuracy of measurement of the known position detecting device depends on the degree of precision with which the coupling probe is held by the dielectric holding system, on the distances of the dielectric holding system in relation to the conductive structure and, respectively, the housing of the cylinder and furthermore on the electrical conductive connections between the coupling probe and the electrical circuit for producing and respectively receiving the microwaves and the conductors between such circuit and the conductive structure and the cylinder housing respectively. Accordingly the requirements set for the accuracy of manufacture are quite substantial if a sufficient accuracy of measurement is aimed at. Owing to the mechanical loads, for example as a result of pressure, vibrations and the like, furthermore the distances between the individual components of the microwave antenna arrangement and/or the electrical circuit may vary so that signal quality of the microwaves and ultimately of the position-related measurement signal become worse even to the stage of complete failure of the position detecting device.

SUMMARY OF THE INVENTION

One object of the present invention is to provide a position detecting device with improved emitting and/or receiving characteristics In order to achieve this and/or other objects appearing from the present specification, claims and drawings, in the present invention in the case of a position detecting device of the type initially mentioned there is a provision such that it possesses a dielectric antenna body with a first pole face and a second pole face for the transmission of microwaves, that the antenna body is a component of the microwave antenna arrangement and that the electrical circuit is arranged at least partly on the antenna body.

The circuit can for example comprise a high frequency (HF) emitter and/or a HF receiver. Furthermore the circuit may also include a switch for incoupling and outcoupling the HF signals to and from the microwave antenna arrangement. On the basis of phase comparison and/or transit time measurement of the microwaves the circuit for example finds the respective position of the specimen. The emission and/or reception property of the position detecting device is improved by having exact spacing distances between the pole faces and between the electrically conductive faces and conductor tracks of the electrical circuit.

The electrical circuit produces the microwaves, e.g. with the aid of conductor tracks, for example meandering and/or straight and/or curved conductor tracks, and with the aid of electrically conductive faces directly on the electrical antenna body, which possesses first and second electrically conductive pole faces for the transmission of the microwaves. In the present context the term "transmission" signifies that the microwaves can be directly radiated by the antenna body into the conductive structure. It is however also possible to provide an additional radiant body, which is arranged on the antenna body and more particularly is held by same.

In the receiving direction as well the invention brings advantages because namely for example with the aid of the above mentioned radiant body it is possible as well to receive microwaves and transmit them directly to the antenna body designed in accordance with the invention. To this extent the radiant body also constitutes a receiving body. The antenna body conducts the microwaves received from the conductive structure directly to the circuit arranged on the antenna body. Accordingly optimum characteristics are also ensured on the receiving side.

It is to be stressed that the inventive position detecting device can comprise an inventively designed microwave antenna arrangement exclusively designed for the emission or the reception of microwaves or preferably for the emission and reception of microwaves.

Preferably the circuit comprises at least one high frequency part. However low frequency parts of the circuit are preferably at least partially arranged on the antenna body in accordance with the invention, for example for determining position signals in a manner dependent on the position of the specimen on the basis of microwave signals of the high frequency part for wired or wireless emission of the position signals and/or reception of control instructions for the position detecting device. It is an advantage for the circuitry to comprise a bus coupler, and more particularly a field bus coupler.

The position detecting device may for example constitute a component of a servo device. The servo device, as for example an electrical and/or fluid power drive, and more especially a pneumatic drive, possesses an electrically conductive housing, in which a servo member, for instance the rotor of an electric motor or, respectively, a piston of the pneumatic drive, is able to move, more particularly linearly. The position detecting device measures for instance the distance of the servo member from a terminal abutment.

The movable specimen or object under test, as for instance the valve member or, respectively, the servo member, reflects microwaves which are fed into the conductive structure or, respectively, the housing with the aid of the coupling probe. On the basis of a transit time measurement and/or on the basis of a phase comparison between the emitted and received microwaves, which for example are in a frequency range of 10 MHz and 25 GHz, the position detecting device finds the respective distance of the specimen from the coupling probe. It will be clear that the microwave antenna arrangement may also comprise two coupling probes, the one for emitting and the other for receiving microwaves. It is particularly preferred however for only one single coupling probe to be necessary.

The position detecting device in accordance with the invention may however also constitute a component of a fluid power servicing device, e.g. a pneumatic servicing device. The position detecting device then serves for instance for measurement of the quantity of an additive for the fluid, as for example of an oil, which is injected into the fluid, or for measurement of a deposited substance extracted by the servicing device and deposited by it in a receiving space. The position detecting device measures the degree of filling as regards the additive or, respectively, the deposited substance of the receiving space.

In accordance with a further form of the invention it is possible for the position detecting device to constitute a component of fluid valve, for example of a pneumatic valve. The specimen is in this case for instance the valve member of the fluid valve, for example a drive piston, with which the valve member is pneumatically driven.

The antenna body is at least partially in the form of a three-dimensional conductive body, e.g. in the form of a molded interconnect device (MID). The conductor tracks and conductive faces may for example be adhesively bonded to the antenna body and/or thermally applied and/or produced by coating. In this respect an at least partly laminated structure is preferred with the result that the antenna body has a multi-layer configuration.

The coatings for the pole faces and/or the conductor tracks and areas of the electrical circuit are for example produced of copper and/or nickel and/or aluminum and/or gold or some other electrically conductive material and may, for example by electroplating and/or by a vapor deposition method, for example, be produced by physical vapor deposition (PVD) and/or chemical vapor deposition (CVD).

The electrically conductive pole faces, conductor tracks for the circuit and the like may also be produced by laser coating and/or by thermal coating.

Preferably a plastic material is employed for the electrical antenna body, such material having a low coefficient of thermal expansion. For instance polycarbonate materials such as Lexan, Makrolon or the like or liquid crystal polymers or copolymers (LCP), e.g. Vectra have been found to be appropriate, Vectra possessing good strength properties and a low coefficient of thermal expansion. The electrical circuit preferably exhibits a first high frequency conductive structure connected with the first pole face, for example by meandering conductor tracks, and a second high frequency conductive structure connected with the second electrically conductive face, with which microwaves may be produced or, respectively, emitted and/or received. The two conductive structure may be coplanar in their arrangement or may also be in a so-called micro-strip array, in the case of which the two conductive structures are insulated from each other by an insulating layer of the antenna body. The layer thickness of such insulation has a substantial influence on the emission and/or reception characteristic of the microwave antenna arrangement. Given a coplanar arrangement of the high frequency conductive structures, of which one comprises or constitutes a ground face, small distances between the conductive structures may be analyzed so that the reactive impedance is small.

The components of the circuit, for example bus coupling components, frequency switches, resistors and the like, are preferably soldered and/or bonded to the antenna body. Moreover, parts of the high frequency conductive structures may be connected with each other by bonded conductors.

The first and/or the second pole face is preferably directly provided for emission and/or reception of the microwaves. An additional radiant body or receiving body is unnecessary so that optimum emission and reception characteristics may be obtained. For instance the first pole face may be arranged on an inner face of an inner space in the antenna body and/or an end side of the antenna body or may at least partially constitute these respective faces. The second pole face is preferably arranged on the outer face or an intermediate face in the peripheral direction of the antenna body or constitutes such respective face. The inner space may be empty or filled with a dielectric or electrically conductive material.

The first pole face is preferably at least partially arranged on an end side, orientated in the emitting and/or receiving direction of the microwave antenna arrangement, of the antenna body and the second pole face may be arranged on a periphery of the antenna body, for example on its outer periphery or an intermediate layer in the peripheral direction.

Between the first and the second pole face it is preferred to provide distances which are constant at least in sections and more especially radially constant. The two pole faces are preferably concentric to one another at least in sections, and more particularly so in a transition portion, to the conductive structure.

The invention also contemplates having one or more pole faces being constituted by a radiant body which is held by the antenna body. The radiant body is for example adhesively bonded, snap-fitted, welded, cast or held by injected material in the antenna body. The radiant body may for example consist of metal. The radiant body will have the same electrical polarity as the pole faces of the coupling probe and is for example electrically connected directly to it. It is more particularly preferred to pot the radiant body with a potting composition or to inject material around it so that the wall thickness of the antenna body is set even owing to the injection mold or, respectively, casting mold. Owing to a following machining operation, as for instance latheturning and/or milling the wall thickness may be more precisely set. When the antenna body together with the radiant body held by it is hardened or cured and if desired fettled, it is externally coated with an electrically conductive material, which then constitutes the pole face of the coupling probe cooperating with the radiant body.

The radiant body may also be produced by casting or injecting an electrically conductive material, e.g. an electrically conductive plastic, in a cavity in the antenna body.

The radiant body will substantially consist of metal. It is however also possible for the radiant body to be a dielectric body which is provided with an electrically conductive coating to constitute one or more pole faces on the microwave antenna arrangement. The radiant body is preferably seated fixedly in the antenna body so that the distances between the pole faces of the radiant body and those of the antenna body remain constant.

The antenna body is preferably inserted bodily, i.e. as an already premounted radiant body, into the conductive structure. In the case of the latter it is for example a question of a housing, in which the specimen is arranged, for example a pneumatic power cylinder. The housing or, respectively, the conductive structure is electrically conductive. A pole face of the antenna, formed by coating, body is electrically connected with the housing, for example by soldering in or on it place, by connection using an electrically conductive adhesive material or the like.

The antenna body preferably exhibits an attachment means for securing it to the conductive structure or respectively the housing, for example in the form of screw means, in an interlocking manner on the conductive structure at the face able to be engaged, detent means, adhesive faces or the like. In principle however attachment by injection or adhesive bonding of the antenna body to the conductive structure is possible.

The first and the second pole face will advantageously be at essentially constant distances apart, for example in sections approximately with a constant radial distances. The two pole faces are insulated electrically from each other. It is a advantage for the first and the second pole faces to be concentric to one another. The coupling probe preferably constitutes a coaxial dipole.

The antenna body is preferably at least in part a body of revolution, as for example a cylinder or a cone. It may also be essentially a cylinder, more particularly a stepped cylinder, which may possess conical sections. Furthermore a plate-like configuration, more particularly of the circuit or any desired combinations of cylindrical, plate-like and/or conical portions are readily possible, as will be explained infra in connection with the working examples of the invention.

The antenna body may also comprise a tubular coated section, e.g. a coated one, which is preferably internally and externally electrically conductive, and forms a coaxial conductor.

The coaxial conductor may for example connect a radiant side and/or a receiving side of the microwave antenna arrangement toward the conductive structure with a support structure for the electrical circuit. The support structure is for example plate-like and arranged at an end side of the coaxial conductor section. It is however possible as well to arrange the electrical circuit, and in particular the high frequency part of this circuit, at least partially on the outer side of the coaxial conductor section. The coaxial conductor section can also be a multi-layer one so that the components and the conductive structures of the circuit, separated by insulating layers, are superposed.

It is possible to furnish the first and/or second pole face at least partially with an electrical insulating layer effective toward the surroundings, for example on the inner side. On the outer side it is in particular preferred for the pole face located there, and more particularly the second pole face, to be so in contact with the conductive structure, in which the specimen under test is placed, that the microwave antenna arrangement may incouple and/or outcouple or receive microwaves into the and respectively, out of the conductive structure.

Further advantageous developments and convenient forms of the invention will be understood from the following detailed descriptive disclosure of embodiments thereof in conjunction with the accompanying drawings.

DETAILED DESCRIPTION OF THE PREFERRED EMBODIMENTS

Figure 1:
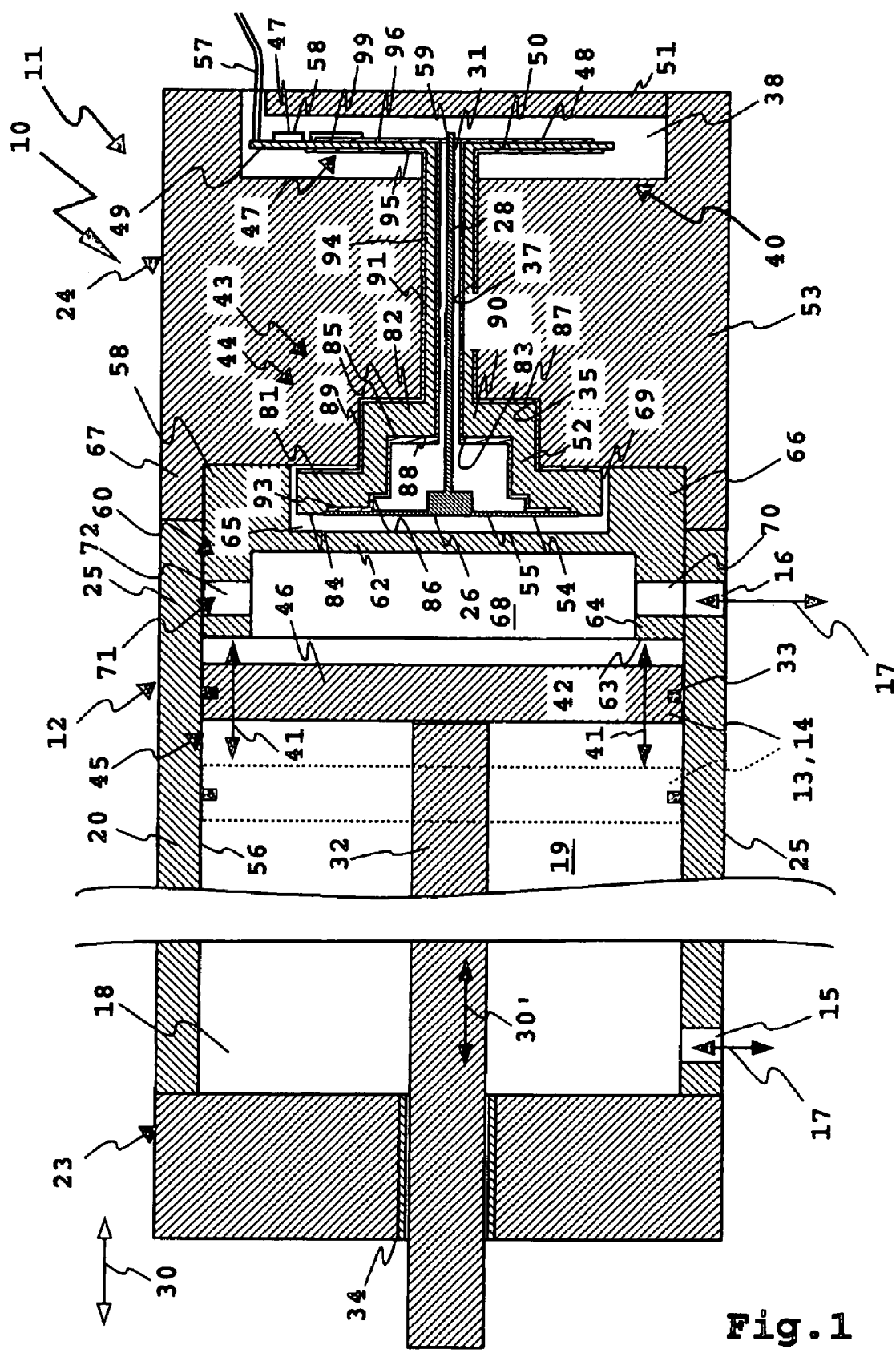
FIG. 1 is a diagrammatic cross sectional view of a servo device, which is fitted with a position detecting device in accordance with the invention, generally on the line A—A through a cover of the servo device as depicted in FIG. 2.

A pneumatic fluid power cylinder 10 constitutes a servo device 11 and more particularly a fluid power servo device. In a housing 12 a piston 13, forming a servo member 14, is able to reciprocate linearly. By way of fluid or, respectively, compressed air connections 15 and 16 compressed air 17 may flow into and out of a chamber 18, constituting a motion space 19 for the servo member 14 to drive the piston 13.

A middle part 20 of the housing 12 possessing a peripheral wall 25, for example of metal, is tubular in design and has an internal cross section matching an external outline of the servo member 14 and for example is essentially circular. An end plate 23 with a bearing and a plain end plate 24 or cover, more particularly of metal, at the ends of the housing 12 shut off the chamber 18 in an air tight manner, for example with plain seals, o-ring seals or the like between covers 23 and 24 and the middle part 20. The end plates 23 and 24 are secured in position f. i. by bolts, which extend through holes 21 to reinforcing and holding ribs 29.

Around the piston 13 there annularly extends a seal 33 so that the piston 13 divides the chamber 18 into two space parts in a pressure-tight fashion from each other. The piston rod 32 constitutes a force transmitting member, which extends through the end plate 23 or cover with the bearing and is borne there by a bearing 34.

The piston 13 is able to move in the longitudinal direction 30 between the end plate 23 with the bearing and the terminal end plate 24 (arrow 30'). A position detecting device 40 determines the distance 41 of the servo member 14 in relation to its end position 42 at the terminal end plate 24.

The position detecting device 40 operates using microwaves, for example in a range of 10 MHz through 25 GHz and preferably approximately 3 through 10 GHz, which are emitted by a microwave antenna arrangement 43 with a coupling probe 44 into the motion space 19, which at least at its internal side is essentially electrically conductive and accordingly constitutes a conductive structure 45 for the microwaves.

The servo member 14 constitutes a specimen 46 which reflects the microwaves. In a manner dependent on the respective position of the specimen 46 in the motion space 19—a position of the servo member 14 remote from the terminal position 42 is indicated in chained lines—the phase relationship of the microwaves emitted and received by the microwave antenna arrangement 43 varies. On the basis of the phase relationship and/or the transit time of the microwaves it is possible for a circuit 47 of the position detecting device 40 to find the position of the servo member 14 in the motion space 19 and for example communicate same to a control means, not illustrated, for the control of the servo device 11, for instance to a memory programmed control device.

The microwave antenna arrangement 43 includes an antenna body 52 which for example has a stepped, cylindrical configuration directed toward the measuring or motion space 19 and at its opposite side has a for example board-like support structure 50 for the circuit 47. The antenna body 52 is manufactured of electrically insulating or dielectric material and may be an injection molded plastic part.

The antenna body 52 centrally and in particular coaxially holds an at least externally electrically conductive radiant body 54 of the microwave antenna arrangement 43.

The antenna body 52 and hence the microwave antenna arrangement 43 are placed centrally and in particular coaxially in relation to the measuring and motion space 19 on a rear end wall 53 of the terminal cover 24, f. i. in a corresponding recess or socket 35 in the terminal wall 53, e.g. plugged into, adhesively bonded, screwed or fitted in it in some other way. The socket 35 has an inner shape matching the outer shape of antenna body 52 so that it makes electrical contact over a large area with inner faces of socket 35.

A wall 90 of the antenna body 52 delimits a socket or, respectively, a receiving space 83 which at its front side facing the measurement and motion space 19 is closed by an end wall 26 of the radiant body 54 which is for example umbrella-like. The end wall 26 is arranged on a cylindrical antenna section 27 of the radiant body 54 and protrudes toward the measurement and motion space 19. In the receiving space 83 a cavity is formed, which is delimited radially externally by the wall 90 and at the end by the end wall 26. The radiant body 54 is connected with the aid of an electrical conductor section 28 with the circuit 47.

A tubular duct section, in the following termed a tube section 91, extends from the socket 83 to the rear and is plugged into the duct 37 of the terminal cover 24. The conductor section 28 of the radiant body 54 extends through the tube section 91 to the rear with an insulating clearance or without one (not illustrated) from the tube section 91 to the support structure 50 with the circuit 47. At the rear end the conductor section 28 has, for example, a screw section or plug section 59 able to be screwed or plugged into a socket 31 and which is electrically connected with the circuit 47. The plug section 59 can also be a solderable section which is soldered to the circuit 47.

The end wall 26 rests against an end side 84 of a front part 81 of the antenna body 52, preferably over a large area or advantageously on segment-like projections 79. The front part 81 exhibits a larger periphery than a rear section 82 of the antenna body 52, which is received in the socket 35. The front part 81 rests on the end wall 53 to the fore or, respectively, protrudes beyond the end wall 53.

The antenna body 52 is manufactured of a dielectric material, in particular a plastic with a low volumetric coefficient of thermal expansion, e.g. Lexan, Vectra or the like. For example in an injection molding operation the thickness of the wall 90 can be optimally set. It is also possible for the antenna body to be a lathe-turned part in order to optimize the quality of manufacture or, respectively, the thickness of the wall 90.

The antenna body 52 is provided with an electrically conductive coating 85, which for example includes copper and/or nickel and/or aluminum and/or gold. The coating 85 is applied by electroplating, chemical and/or physical vapor coating, sputtering or the like to the antenna body 52. The coating 85 constitutes a first and a second pole face 86 and 87.

The first pole face 86 is formed with a circular end side section 93 on the end side 84 and an inner face 88 of the receiving space 83. The radiant body 54 constitutes a first pole face 55, which is connected with the first pole face 86 of the antenna body 52 electrically, for example by electrically conductive adhesive or a soldered joint. The radiant body 54 could also be press-fitted in the receiving space 83.

The second pole face 87 is formed on the outer periphery 89 of the antenna body 52 and is electrically connected with the conductive structure 45, for example press-fitted in the socket 35 and/or adhesively bonded in an electrically conductive manner and/or soldered therein or the like.

The pole faces 86 and 87 also extend over the tube section 91 so that the inner face and the outer periphery of the tube station 91 are coated metallically in a conductive manner. Accordingly the tube section 91 constitutes a coaxial conductive section 94. The microwaves change from a coaxial mode into a wave guide mode on passing from the end wall 26 toward the motion space 19.

In accordance with an altered design of the invention the radiant body 54 may have the antenna body cast 52 or in particular injected around it in an injection molding process.

The position of the microwave antenna arrangement 43 in relation to the housing 12 or, respectively, the conductive structure 45, with which the microwave antenna arrangement 43 cooperates, and more especially however the position of the pole faces of the microwave antenna arrangement 43 in relation to each other, is essential for exactly setting the distance 41. In order for such positioning of the microwave antenna arrangement 43 to be adhered to and accordingly for a high accuracy of measurement to be achieved, the following measures are taken in the case of the servo device 11 which respectively constitute separate inventions in their own right.

A guard cover means 60 provides a pressure-tight seal sealing off the microwave antenna arrangement 43 from the pressure and motion space 19. In front of the microwave antenna arrangement 43 a cover section 62 is arranged, which is held by an abutment section 61 and more particularly an abutment ring 64. The two parts 62 and 64 are connected together in a pressure-tight manner, e.g. by means of seals, not illustrated, or they are of integral design. The abutment ring 64 constitutes at the front an abutment 63 for the piston 13. The guard cover means 60 is inserted in the housing 12 in a pressure-tight manner, for example molded on the end plate 24 and/or engaged by seals (not illustrated), e.g. between an outer periphery of the guard cover means 60 and the sides or peripheral wall 25 and/or a side or peripheral wall of the end plate 24. In the rear section of the guard cover means 60 a chamber 65 is defined by the floor-like cover section 62 and a rear side wall 66. A front part, projecting to the fore of the end wall 53, of the microwave antenna arrangement 43 is accommodated to protect it against environmental effects in the chamber 65 and has a clearance 69 to the fore and preferably to the side, from the guard cover means 60, into which clearance the cover section can deform, e.g. owing to a pressure wave, which is engendered by the servo member 14.

The abutment ring 64 projects to the fore of the terminal end plate 24 and extends into the middle part 20. At its front section, between the abutment 63 and the intermediate cover, which constitutes the terminal section 62, the abutment ring 64 delimits a receiving space 68, for example for a terminal position damping means, not illustrated, on the front of the piston 13.

The guard cover means 60 comprises a fluid duct 70 for connection of the chamber 18 with the compressed air connection 16, which for example extends through the abutment ring 64.

In order for the microwaves to be propagated essentially symmetrically in the motion space 19, a blind duct 72 is provided as a compensating means 71 for the fluid duct 70, such duct 72 extending on the side, opposite to the fluid duct 70, of the abutment ring 64. The blind duct 72 terminates at the peripheral wall 67, i.e. the peripheral wall 67 terminates the blind duct 72 in a radially outward direction.

The guard cover means 60 consists of a dielectric material, more particularly a plastic with a low coefficient of thermal volumetric change, for example of Lexan, Vectra or the like. The guard cover means 60 is matched to the radiating characteristics of the microwave antenna arrangement 43 so that the microwaves, which are radiated by the microwave antenna arrangement 43, are propagated in a predetermined mode in the conductive structure 45 or, respectively, in the motion space 19.

A front part 73 of the guard cover means 60 exhibits a larger diameter than a rear part 74 so that between the front and the rear part 73 and 74 an abutment 75 is formed. This is not illustrated in the diagrammatic showing of FIG. 1. The abutment 75 engages an end face 77 of the peripheral wall 67 of the terminal end plate 24 or cover. Accordingly the guard cover means 60 bears against the rear end wall 53 of the terminal end plate 24 and the end face 77.

The thickness of a wall 90 of the antenna body 52, on whose inner face 88 and outer periphery 89 the metallized layer or other layer 85 is arranged, is constant in sections thereof. Accordingly even the respective distances in sections between the first and the second pole faces 86 and 87 are at least essentially constant so that microwaves emitted by the microwave antenna arrangement 43 have optimum frequency characteristics.

The circuit 47 comprises for example a high frequency part 48 for the production and/or emission and reception of microwaves by means of the coupling probe 44 and an evaluating part 49 for finding a position of the specimen 46 on the basis of the microwaves. The high frequency part 84 includes or constitutes a microwave emission means and a microwave receiving means.

The evaluating part 49 comprises components 58 soldered or electrically connected in some other manner on the support structure, and including for example a digital signal processor, resistors, a bus coupling means, an emission and/or reception means for the wired or wireless emission of position signals by means of a conductor 57 and/or an antenna, not illustrated, to a master control and the like.

The parts 48 and 49 are electrically connected together, for example with electrical conductor tracks. A cover 51 protects the circuit 47, which is for example arranged in a chamber 38 in the housing 12 or, respectively, in the terminal cover 24, against effects of the environment.

Figure 2:
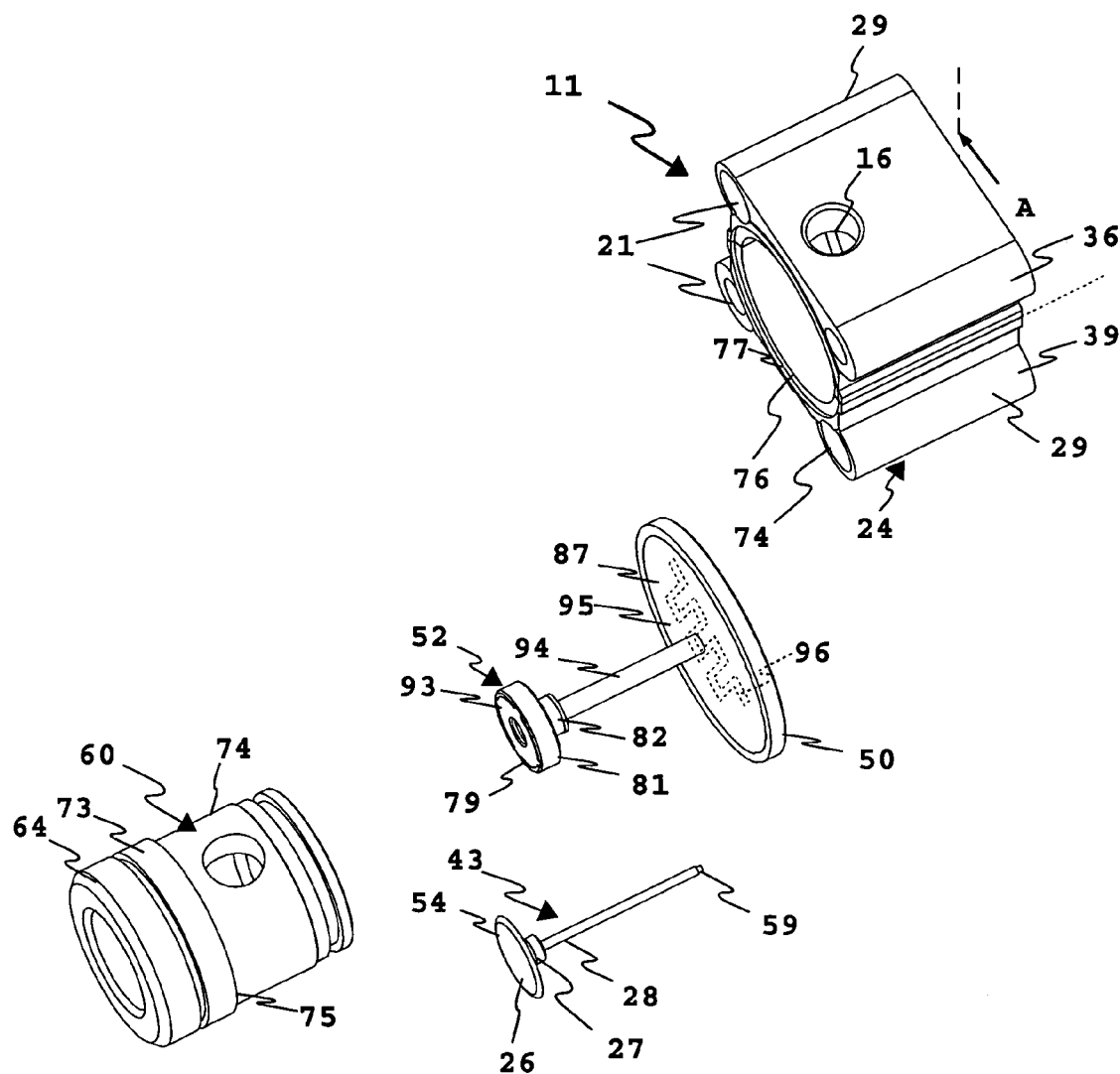
FIG. 2 is an exploded perspective view of a cover portion in accordance with FIG. 1 with a guard cover means, a radiant body and an antenna body for holding the radiant body.
Figure 3:
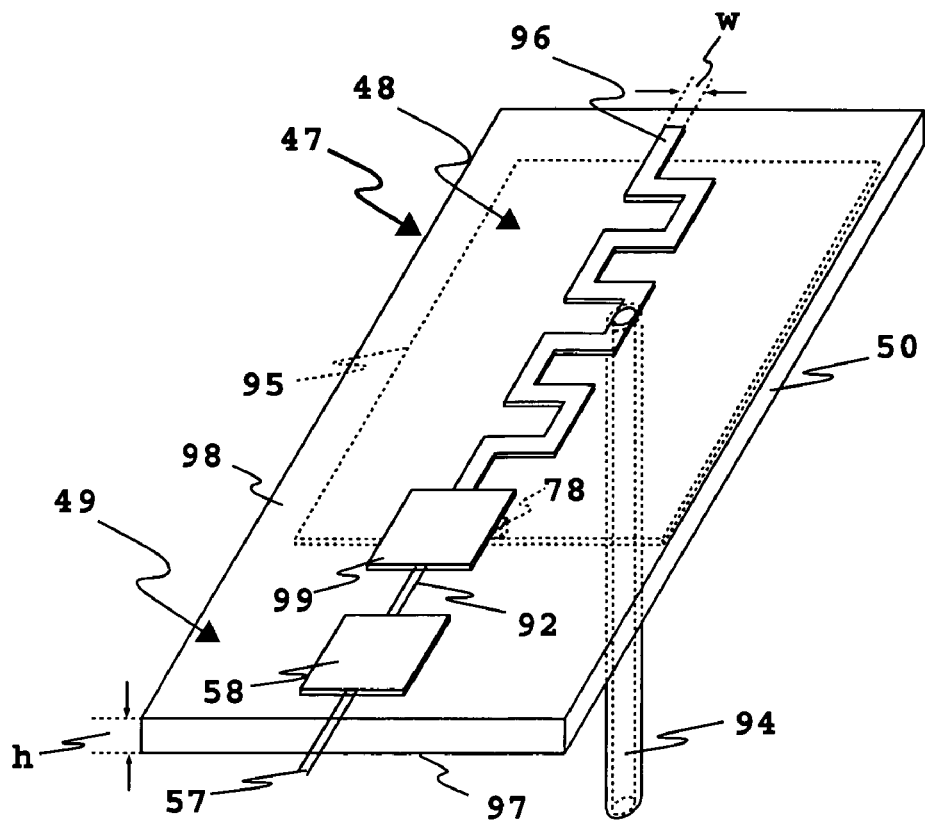
FIG. 3 is a diagrammatic cross sectional view of a modified antenna body as shown in FIG. 1 which has conductive structures in a micro-strip arrangement.
Figure 11:
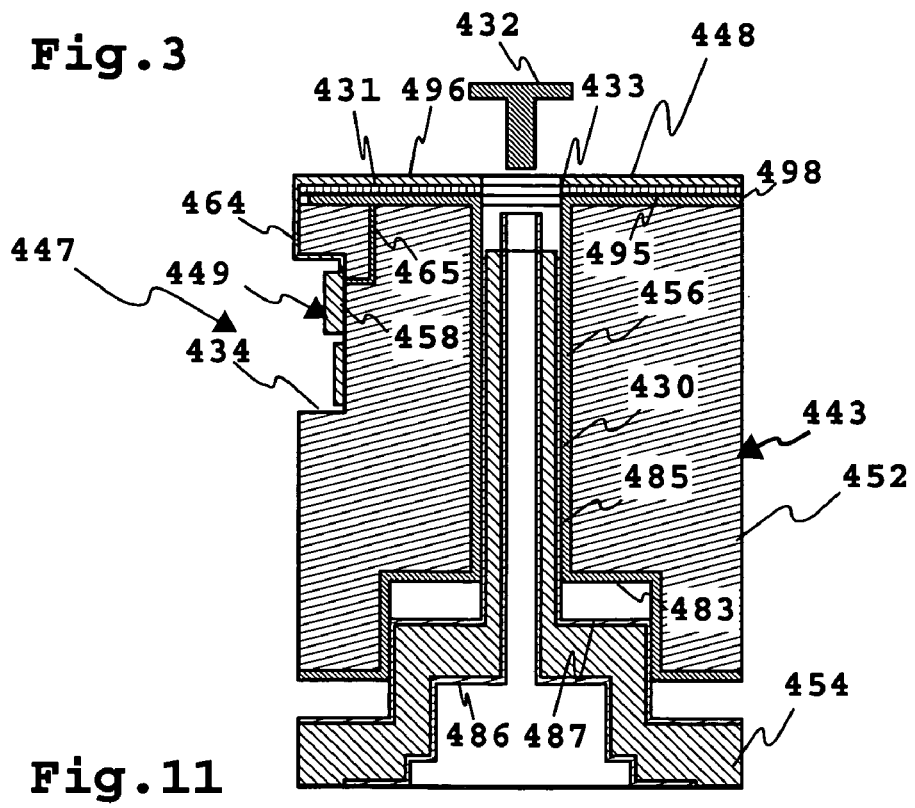
FIG. 11 is a detailed exploded view of a microwave antenna arrangement of the position detecting device as shown in FIG. 10.

The external coating or, respectively, the second pole face 87 extends from the coaxial conductor 94 also to the bottom side 97 of the board or, respectively, 50 where it constitutes a ground face 95. The inner, first pole face 86 extends out of the coaxial conductor 94 also to the support structure 50 at the top side 98 thereof, where it constitutes an antenna conductor 96 or is electrically connected with it. The ground face 95 and/or antenna conductor 96, which form high frequency structures, may have any desired geometry in accordance with the desired property of the microwaves to be emitted and/or received. For instance the antenna conductor 96 may have a meandering configuration. The antenna conductor 96 and the ground face 95 are separated from one another by the electrically insulating support structure 50, which for example is in the form of a round (see FIGS. 1 and 2) or polygonal (see diagrammatic showing in FIG. 3) board, so that a micro-strip arrangement is formed. One width w of the antenna conductor 96 and one thickness or height h of the support structure 50 define the electrical reactive impedance at the input of the micro-strip circuit.

The high frequency part 48 can also comprise other, merely diagrammatically indicated, components 99, as for example incoupling and outcoupling elements for the microwaves to be emitted and, respectively, received, capacitors, millimeter wave ICs, directional couplers and the like on the support structure, to which they are soldered, bonded or electrically connected thereto in some other way or at least partially constituted by conductive structures. Vias or through connections 78 connect the HF components 99 with the second pole face 87 or, respectively, ground face 95 arranged on the bottom side.

The components 58 and 99 and furthermore the other elements of the circuit 47 are interconnected by diagrammatically indicated conductor tracks 92. The conductor tracks 92 are preferably produced by coating, thermal bonding in place, adhesive bonding, laser coating, electroplating or the like.

The support structure 50 can, in particular at the evaluating part 49, have a multi-layer structure, layers with conductor tracks being separated from each other by insulation layers.

It will be clear that the evaluating part 49 can also be constituted by a separate board (not illustrated).

The antenna body 52 is preferably bodily inserted with an already premounted radiant body 54 and a completely assembled circuit 47 into the terminal cover 24. The terminal cover 24 is in the present case made in two parts, i.e. it has a top part 36 and a bottom part 39 so that for example the antenna body 52 is firstly inserted into the bottom part 39 and then the top part 36 is adhesively bonded, screwed or otherwise secured to it.

In the case of a modification of the working example in accordance with FIG. 1 it would be feasible as well for the coating 85 to be essentially only applied on the outside to form the second pole face 87, whereas a smaller inner part of the coating as the first pole face 86 would serve essentially as a contact face for the antenna body 52. The antenna body 52 and the second pole face 87 then serve as the coupling probe.

It is also possible to inject material of the radiant body 54 around the antenna body 52 and afterward to coat the outer side of the antenna body 52 with the second pole face 87 in an electrically conductive manner.

Figure 4:
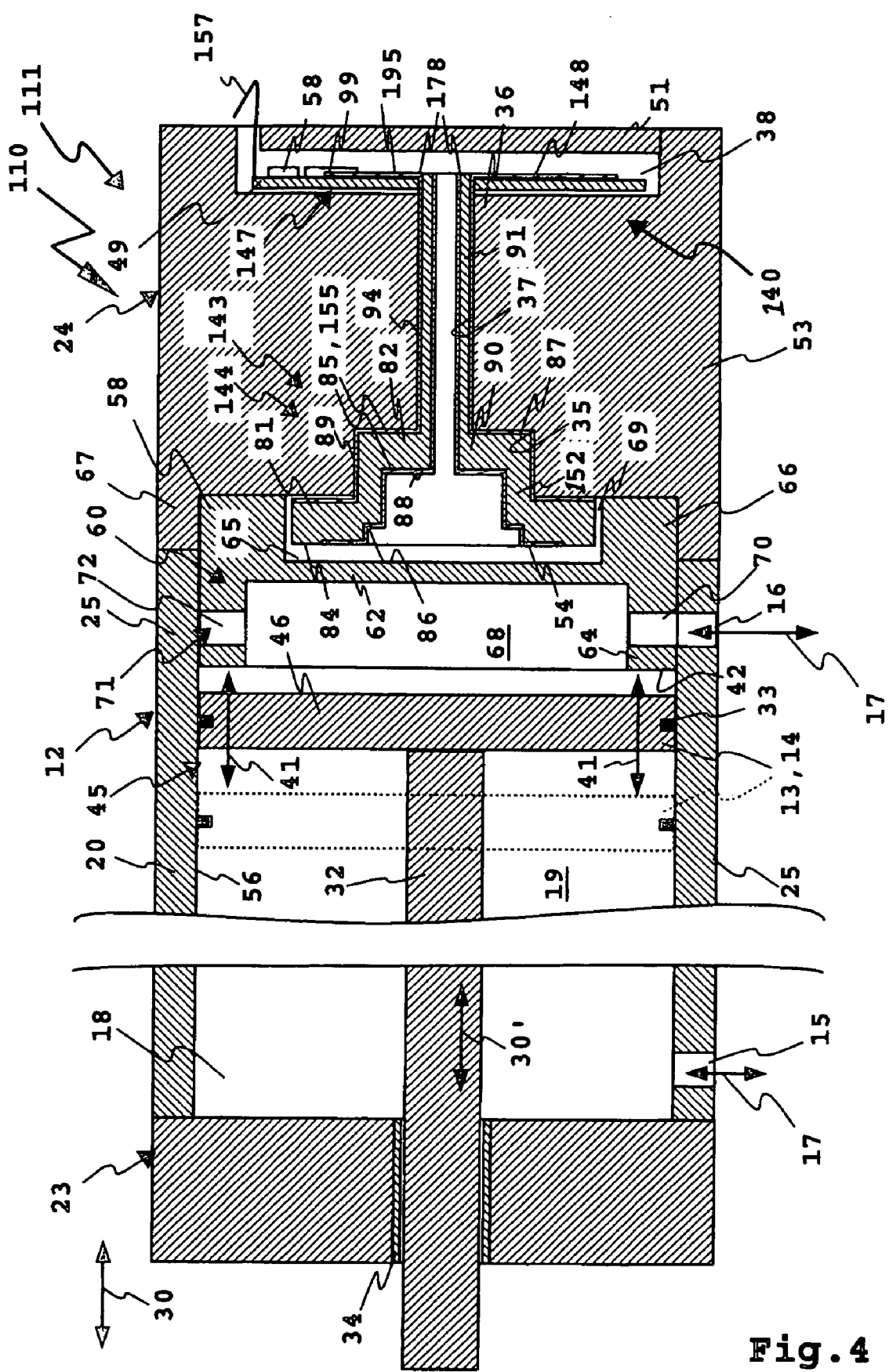
FIG. 4 shows a diagrammatic cross sectional view generally corresponding to FIG. 1 of a second servo device with a further working example of a microwave antenna arrangement in accordance with the invention.
Figure 5:
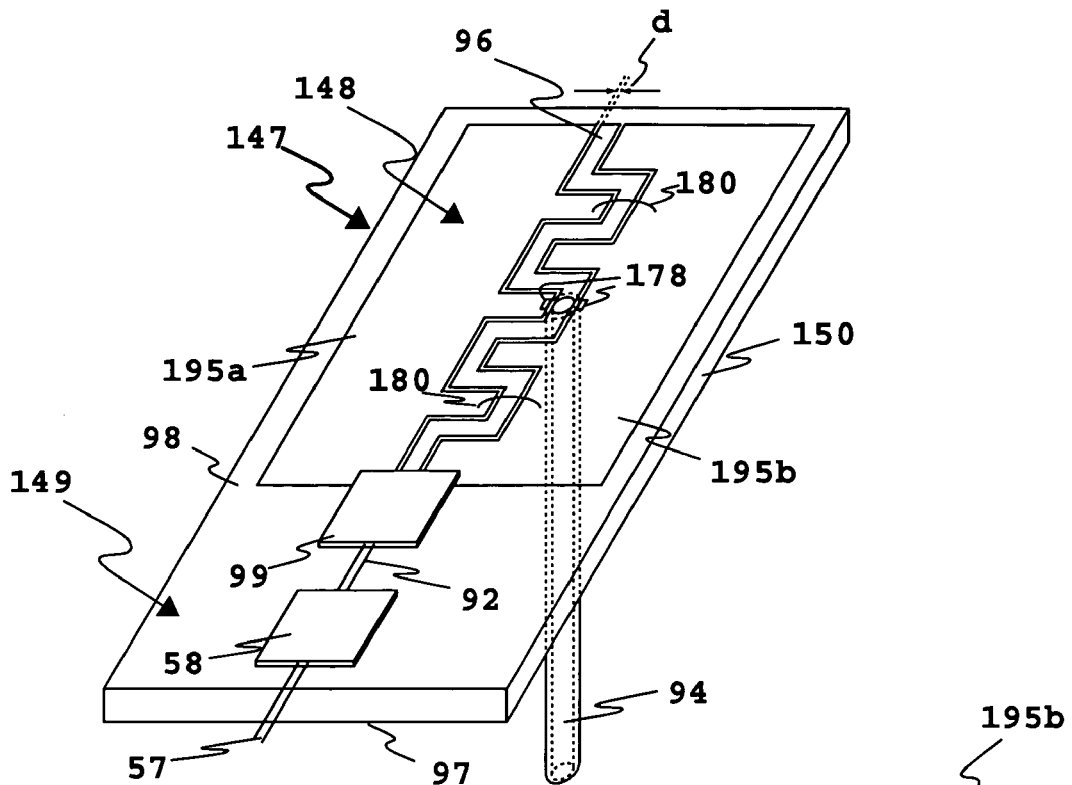
FIG. 5 is a diagrammatic perspective view of a modified antenna body similar to that in FIG. 4, same exhibiting coplanar conductive structures.
Figure 6:
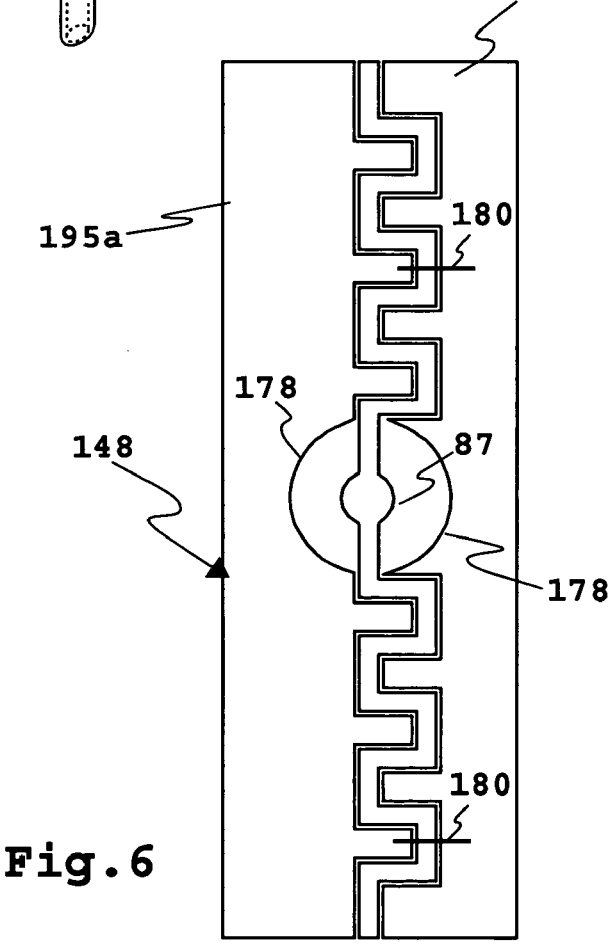
FIG. 6 is plan view of the conductive structures of the antenna body as shown in FIG. 5.

In the FIGS. 4, 5 and 6 a position detecting device 140 with a microwave antenna arrangement 143 is illustrated which unlike the circuit 47 possesses a coplanar circuit 147 with a high frequency part 148. The position detecting device constitutes a component of a pneumatic power cylinder 110 or, respectively, of a servo device 111. which is similar in structure to the servo device 11 so that substantially the same reference numerals are employed and partly to make departures clear reference numerals increased by 100 are used.

An antenna body 152 serve directly as an emission and reception dipole or, respectively, coupling probe 144, this meaning that the inner first pole face 86 and the outer pole face 87 serve directly as radiant faces and receiving faces 155 for microwaves.

The inner pole face 86 is extended out of the inner space of the coaxial conductor 94 to the top face of a board or, respectively, support structure 150 for the circuit 147 where it merges into a meandering or (not illustrated) a straight antenna conductor 196. In a clearance d, which is best of small size, between it and the antenna conductor 196 electrically conductive faces 159a and 159b, for example ground faces, are arranged. The faces 195a and 195b preferably have on their side facing the antenna conductor 196 a structure correlating with the form of the antenna conductor 196, e.g. with a zigzag structure, in order to be closely adjacent to the antenna conductor 196. Accordingly the high frequency part 148 has a low electrical reactive impedance.

The ground faces 195a and 195b are furthermore interconnected by conductor connections 180, which bridge over the antenna conductor 196. This offers the advantage that for instance microwaves with an undesired frequency and/or amplitude are suppressed. The conductor connections 180 are for instance so-called bond connection or wire connections. From the outer second pole face 87 on the coaxial conductor 94 vias 178 lead to the top side 98 of the support structure 150. The circuit 147 communicates in a wireless manner, for example using an antenna 157, with a master control and/or monitoring means, not illustrated.

Figure 7:
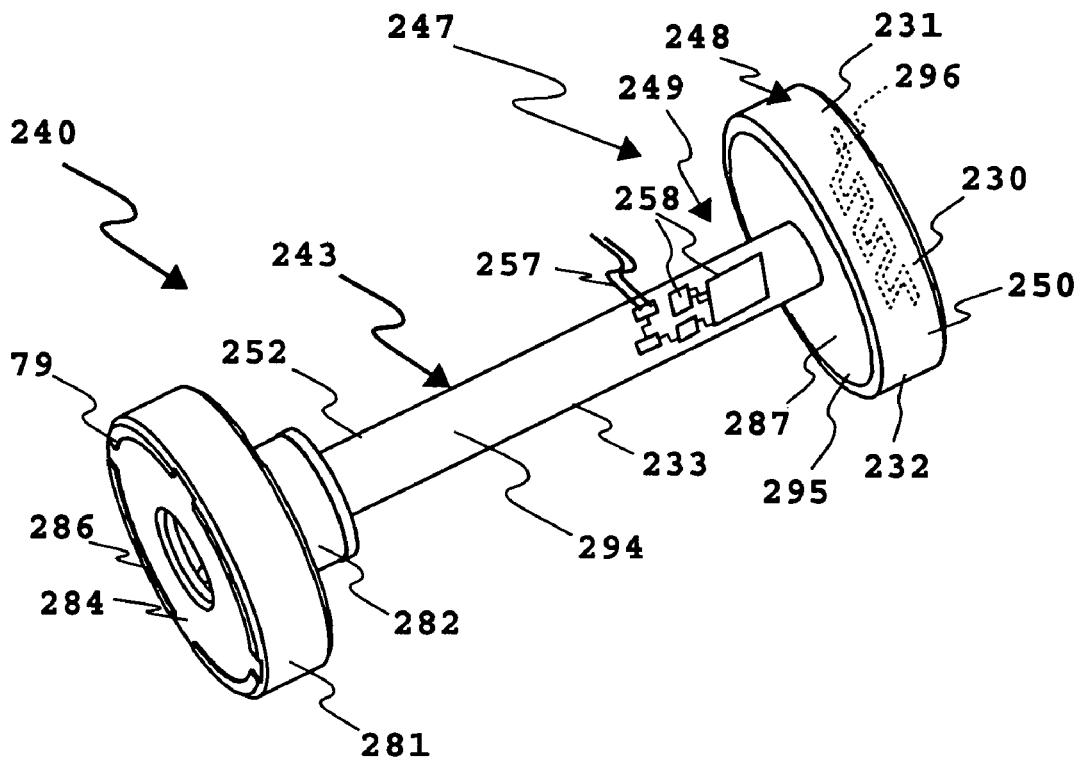
FIG. 7 is a diagrammatic perspective view of an antenna body with a coaxial conductor section and a terminally arranged cylindrical support structure for a high frequency circuit.

FIG. 7 shows a modification of the microwave antenna arrangement 43 in the form of a microwave antenna arrangement 243 of a position detecting device 240. The front part of the microwave antenna arrangement 43 is substantially similar to that of the microwave antenna arrangement 43: for instance the radiant body 54 could be adapted to be mounted to the fore on or in an antenna body 252 (not illustrated). Identical or similar components of the microwave antenna arrangement 243 bear the same reference numerals as the microwave antenna arrangement 43 or with reference numerals increased by 200.

A first pole face 286 extends from an end side 284 of a front part 281 of the antenna body 252 right through a coaxial conductor 294 and merges at a rear side 298 of the antenna body 252 with an antenna conductor 296 or is electrically connected with the antenna conductor 296. The antenna conductor 296 is located on the inner side 230 of a bell-like tube 231, for example on its floor face and/or peripheral wall. The tube 231 preferably has a larger diameter than the coaxial conductor 294.

The outer second pole face 287 extends from the front part 281 of the antenna body 252 past the coaxial conductor 294 as far as the outer side 232 of the tube 231, where it constitutes a ground face or is electrically connected with same. The ground face 295 and the antenna conductor 296 together constitute the high frequency part 248 of a circuit 247. At the coaxial conductor 294 the second pole face 287 is provided with electrical insulation 233 radially externally completely or partially. Accordingly it is possible to arrange conductor tracks and components 258 of an evaluating part 294 on the coaxial conductor 294. The evaluating part 294 transmits position signals by way of conductor 257 to a master control, not illustrated. The tube 231 constitutes a support structure 250 of the high frequency part 248 and the coaxial conductor 294 constitutes a support structure for the evaluating part 249.

Figures 8, 9:
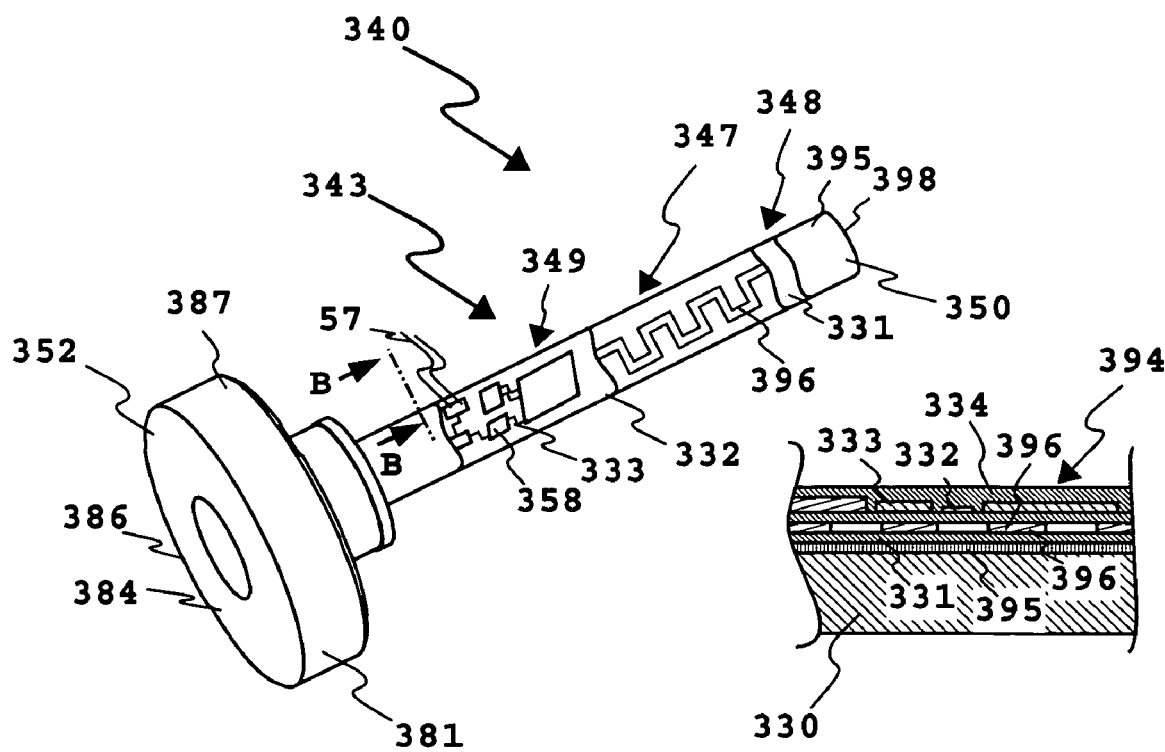
FIG. 8 is a diagrammatic perspective view of an antenna body with a coaxial conductor section which has a multi-layer structure as a base for a HF circuit.
FIG. 9 is a cross sectional view of a coaxial conductor section as part of the antenna body as shown in FIG. 8 on the line B-B in FIG. 8.

The position detecting device 340 in accordance with FIG. 8 exhibits a microwave antenna arrangement 343 with an antenna body 252, which is manufactured of a dielectric material as for example plastic. To the extent that the position detecting device 340 possesses identical or similar component like the position detecting devices 40, 140 and 240 of the previously described embodiments of the invention, the same reference numerals will be employed, partly with a preceding "3".

An external second pole face 387 arranged on the front part 381 of the antenna body 352 is extended on a wall 330 of the coaxial conductor 394 to the rear as far as a rear end side or rear side 398 to form a ground face 395 at the coaxial conductor 394. On the ground face 395 there is an insulation layer 331, for example of plastic. On the insulation layer 331 an antenna conductor 396 is arranged which is for example meandering or straight and is applied for example by electroplating, sputtering or the like, such conductor 396 being connected with a first pole face 386 electrically, such pole face 386 extending from one end side 384 of the antenna body 352 inwardly through the coaxial conductor 394 as far as the rear end side 398 where it is connected electrically with the antenna conductor 396. The ground face 395 and the antenna conductor 396 constitute a high frequency part 348 of a circuit 347.

All in all the coaxial conductor 394 forms a support structure 350 for the circuit 347. On the layer with the antenna conductor 396 there is namely a further insulation layer 332, on which a conductive structure 333 for electrical connection of components 258, as for example signal processors, operational amplifiers or the like, of an evaluating part 349 of the circuit 347 is arranged. The circuit 347 is protected against environmental influences by an outer insulation layer 334, as for example a potting composition or the like. Consequently all significant components of the position detecting device 440 are arranged on the antenna body 352, partly in a multi-layer or multi-coating onion-like structure.

Figure 10:
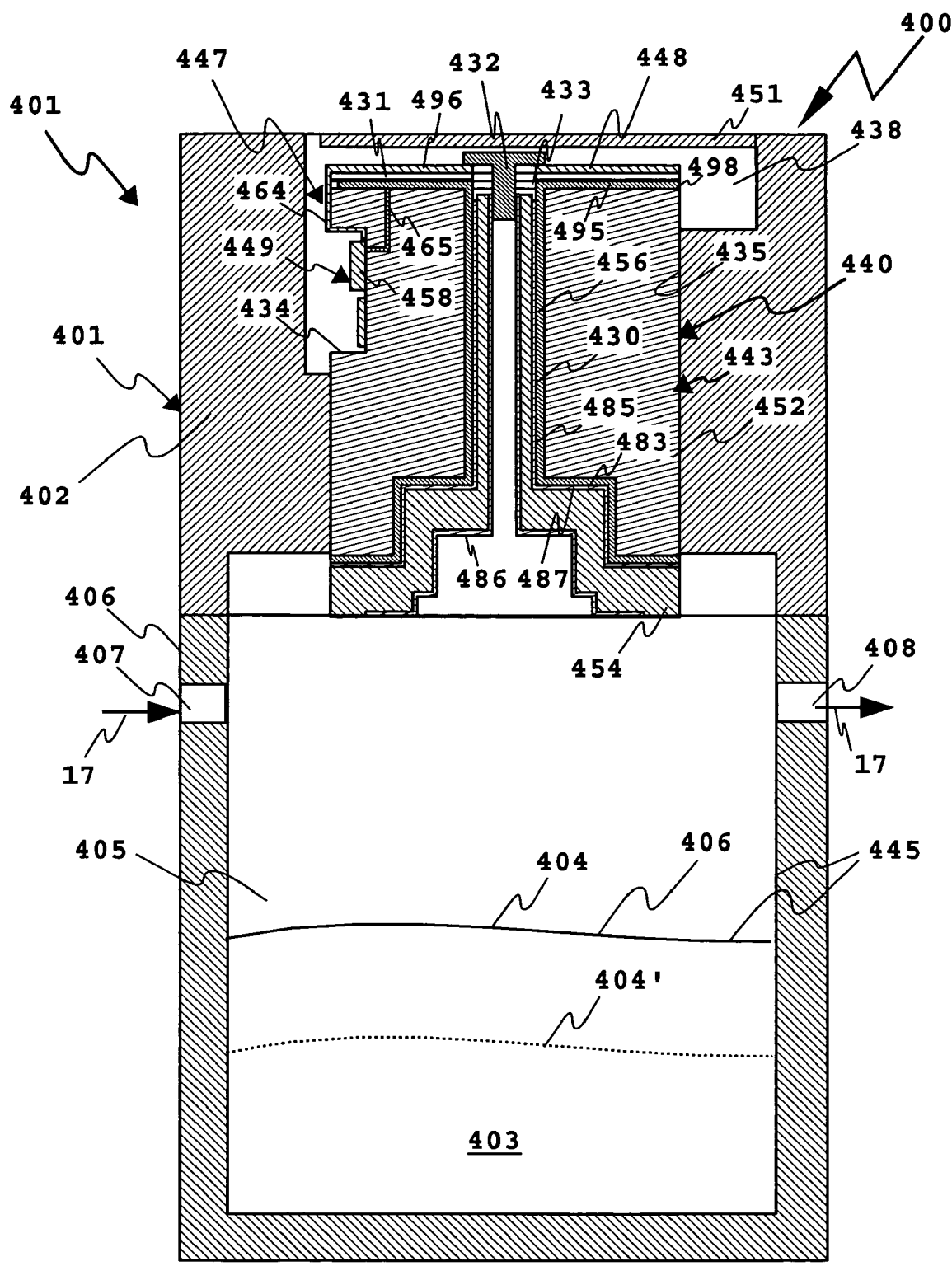
FIG. 10 shows a cross section taken through a pneumatic servicing device, in the case of which a position detecting device or distance detecting device in accordance with the invention is to measure the filling level of a liquid or a powder.

A further field of application of a position detecting device in accordance with the invention is represented in FIG. 10. A position detecting device 440 is incorporated in a fluid power and in particular pneumatic servicing device 400, as for example a oiler or dryer for preparing compressed air 17. The position detecting device 440 is arranged on the top side of a housing 401 in the cover 402 of a container 406 and measures the level 404 and 404' of filling of liquid 403, for example of a product deposited from the compressed air 17 or of an additive that is mixed with the compressed air 17. The liquid 403 is contained in a receiving space 405 in the container 406 below the position detecting device 440. The compressed air 17 flows through an inlet 407 into the receiving space 405 and leaves it through an outlet 408 again.

The housing 401 is electrically conductive at least in the receiving space 405 and thus bears an electrically conductive structure 445. The liquid 403 constitutes a specimen

446. The position detecting device 440 measures a distance 441 of the liquid 403 from the cover 402. The position detecting device 440 signalizes the level 404 and 404' in a wired manner by way of a conductor 457, more particularly a bus conductor, to a control device, not illustrated, and/or a display device.

The position detecting device 440 comprises a microwave antenna arrangement 443, which is placed in a socket 435 in the top part or cover 402 and is held by the cover 402. An antenna body 452 is provided on its inner side and in a front socket 483 shaped with a stepped cylindrical face, with an electrically conductive coating 485. The coating 485 is applied for example to a dielectric base body, consisting for example of plastic, of the antenna body 452, for example by chemical and/or physical vapor deposition. From the socket 483 there extends a tubular duct 430 to the rear, which just like a rear side 498 of the antenna body 452 is provided with the coating 485, which generally constitutes a second pole face 456.

The antenna body 452 holds a radiant body 454, which is also manufactured of a dielectric material, both externally and also internally which is however provided with an electrically conductive coating, which forms an inner first pole face 486 and an outer second pole face 487, which are electrically insulated from one another. The radiant body 454 has a configuration matching the socket 483 and, respectively, the duct 430 so that the pole faces 456 and 487 come to engage each other in an electrically conductive manner over wide areas and preferably additionally are electrically connected by a soldered joint or the like with each other. The radiant body 454 is for example from the front (in the drawing from below) plugged and/or screwed into the socket 483, optionally present screw threads not being illustrated in order to make the drawing more straightforward.

On the part of the second pole face 456 located on the rear side 498 an electrical insulation layer 431 is arranged, on which in turn an antenna conductor 496 is located. An electrical contact member 432 is inserted from the rear side 398 through a recess 433, that is to say at a distance from the rear second pole face 456 or, respectively, ground face 495 in order to connect the first pole face 486 with the antenna conductor 496 electrically. The contact member 432 is for example a spike with an end board or some other metallic component. The ground face 495 and the antenna conductor 496 constitute a high frequency part 448 of a circuit 447 of the position detecting device 440. The high frequency part 448 is located in a chamber 438 which is for example closed by a cover 451.

Laterally on the antenna body 452 there is a recess 434 with which the ground face 495 or, respectively, the antenna conductor 496 is electrically connected, for example with conductor connections 464 and 465, which externally on the antenna body 452 or, respectively, as vias lead to conductor tracks and components 458 of an evaluating part 449 of the circuit 447. In the recess 434 a multi-layer structure for the components 458 may be also provided for corresponding conductor tracks and connecting conductors for the components 485. All in all the antenna body 452 constitutes a support structure for the circuit 447.

The invention claimed is:

1. A position detecting device for finding the position of a specimen arranged in a conductive structure on the basis of microwaves, comprising an electrical circuit for producing and/or receiving the microwaves, a microwave antenna arrangement for emitting and/or receiving the microwaves, and a dielectric antenna body with a first pole face and a second pole face for the transmission of microwaves, the antenna body being a component of the microwave antenna arrangement and the electrical circuit being arranged at least partly on the antenna body, wherein the first and/or the second pole face is constituted by an electrically conductive coating.

2. The position detecting device as set forth in claim 1, wherein the electrical circuit exhibits a first high frequency conductive structure connected with the first pole face and a second high frequency conductive structure connected with the second pole face for producing and/or receiving the microwave, the first and the second conductive structure being arranged in a coplanar manner and/or in a micro-strip arrangement in relation to each other.

3. The position detecting device as set forth in claim 1, wherein the circuit comprises an evaluating means for determining position values on the basis of the microwaves and/or an emitting means, more particularly a bus coupling means, for communicating position values.

4. The position detecting device as set forth in claim 1, wherein the circuit comprises components which are soldered and/or bonded to the antenna body.

5. The position detecting device as set forth in claim 1, wherein the antenna body has a multi-layer structure in particular in the circuit.

6. The position detecting device as set forth in claim 1, wherein the antenna body has, at least in part, a cylindrical and/or plate-like configuration.

7. The position detecting device as set forth in claim 1, wherein the antenna body is at least in part in the form of an MID conductive structure.

8. The position detecting device as set forth in claim 1, wherein the first and/or the second pole face is provided to radiate the microwaves into the conductive structure and/or for reception from the conductive structure.

9. The position detecting device as set forth in claim 1, wherein the first pole face is arranged at least in part on an end side, orientated toward the emitting and/or receiving means of the microwave antenna arrangement, of the antenna body and the second pole face is arranged on a periphery of the antenna body.

10. The position detecting device as set forth in claim 1, wherein between the first and the second pole face in sections essentially constant and more particularly radially constant distances obtain.

11. The position detecting device as set forth in claim 1, wherein the first and the second pole face are in section concentric to one another.

12. The position detecting device as set forth in claim 1, wherein the antenna body constitutes a holding means for a radiant body of the microwave antenna arrangement.

13. The position detecting device as set forth in claim 12, wherein the radiant body consists essentially of metal.

14. The position detecting device as set forth in claim 12, wherein the radiant body is a dielectric body provided with an electrically conductive coating for the formation of a pole face of the microwave antenna arrangement.

15. The position detecting device as set forth in claim 1, wherein the first and/or the second pole face is a pole face produced by a physical and/or chemical vapor deposition process and/or by electroplating and/or laser coating and/or by thermal coating.

16. The position detecting device as set forth in claim 1, wherein the first and/or the second pole face is connected or able to be connected with the conductive structure electrically.

17. The position detecting device as set forth in claim 1, wherein the antenna body possesses an attachment means for attachment to the conductive structure.

18. The position detecting device as set forth in claim 1, wherein the first and/or the second pole face is at least in part provided with an electrical insulation layer facing the environment.

19. The position detecting device as set forth in claim 1, wherein a section of the antenna body is designed as a coaxial conductor.

20. The position detecting device as set forth in claim 19, wherein the electrical circuit is arranged at least in part on the outer side of the coaxial conductor section of the antenna body.

21. The position detecting device as set forth in claim 19, wherein the electrical circuit is arranged at least in part on a more particularly board-like support structure of the antenna body, such support structure being arranged on an end side of the coaxial conductor section.

22. The position detecting device as set forth in claim 1, in the form of a component of a servo device, more particularly an electrical and/or fluid power drive, the specimen being a servo member of the servo device.

23. The position detecting device as set forth in claim 1, in the form of a component of a fluid power and more especially pneumatic servicing device and also being adapted for measurement of the quantity of an additive for the liquid and/or a product deposited from the fluid in a receiving space of the servicing device.

24. The position detecting device as set forth in claim 1, in the form of a component of a fluid valve and more particularly a pneumatic valve, said specimen being a valve member of the fluid valve.

25. A position detecting device for finding the position of a specimen arranged in a conductive structure on the basis of microwaves, comprising an electrical circuit for producing and/or receiving the microwaves, a microwave antenna arrangement for emitting and/or receiving the microwaves, and a dielectric antenna body with a first pole face and a second pole face for the transmission of microwaves, the antenna body being a component of the microwave antenna arrangement and the electrical circuit being arranged at least partly on the antenna body, wherein the first and/or the second pole face is connected or able to be connected with the conductive structure electrically.

26. A position detecting device for finding the position of a specimen arranged in a conductive structure on the basis of microwaves, comprising an electrical circuit for producing and/or receiving the microwaves, a microwave antenna arrangement for emitting and/or receiving the microwaves, and a dielectric antenna body with a first pole face and a second pole face for the transmission of microwaves, the antenna body being a component of the microwave antenna arrangement and the electrical circuit being arranged at least partly on the antenna body, wherein the antenna body possesses an attachment means for attachment to the conductive structure.

27. A position detecting device for finding the position of a specimen arranged in a conductive structure on the basis of microwaves, comprising an electrical circuit for producing and/or receiving the microwaves, a microwave antenna arrangement for emitting and/or receiving the microwaves, and a dielectric antenna body with a first pole face and a second pole face for the transmission of microwaves, the antenna body being a component of the microwave antenna arrangement and the electrical circuit being arranged at least partly on the antenna body, wherein the first and/or the second pole face is at least in part provided with an electrical insulation layer facing the environment.

* * * * *